United States Patent [19]

Herchenbach et al.

[11] Patent Number: 5,042,588
[45] Date of Patent: Aug. 27, 1991

[54] LIFTING STRUT FOR A TRACTOR

[75] Inventors: Paul Herchenbach, Ruppichteroth; Helmut Kamp, Kalletal-Asendorf; Hans-Jürgen Langen, Frechen, all of Fed. Rep. of Germany

[73] Assignee: Jean Walterscheid GmbH

[21] Appl. No.: 612,615

[22] Filed: Nov. 13, 1990

[30] Foreign Application Priority Data

Nov. 18, 1989 [DE] Fed. Rep. of Germany ....... 3938418

[51] Int. Cl.$^5$ .................. A01B 59/043; A01B 59/06; A01B 63/02
[52] U.S. Cl. ........................... 172/439; 74/586; 172/776; 403/327; 403/46
[58] Field of Search ............... 172/439, 443, 444, 448, 172/677, 679, 680, 681, 734, 776; 74/586; 403/46, 45, 327, 328, 377, 43, 44, 47

[56] References Cited

U.S. PATENT DOCUMENTS

| | | | |
|---|---|---|---|
| 3,056,458 | 10/1962 | Gray | 172/448 |
| 3,255,828 | 6/1966 | Abott | 172/439 |
| 3,498,638 | 3/1970 | Magruder | 172/439 |
| 3,708,017 | 1/1973 | Alexandrovsky et al. | 172/439 |
| 3,825,283 | 7/1974 | Hansen | 172/439 |
| 3,837,753 | 9/1974 | Weiste et al. | 403/327 |
| 4,519,623 | 5/1985 | Orthman | 172/439 |
| 4,715,770 | 12/1987 | Kryscyk | 172/443 |

Primary Examiner—Dennis L. Taylor
Assistant Examiner—Spencer K. Warnick
Attorney, Agent, or Firm—Toren, McGeady & Associates

[57] ABSTRACT

A lifting strut having an adjusting sleeve with an externally threaded portion and an internally threaded portion. A connecting end with a threaded journal is screwed into the internally threaded portion, with a connecting end with a threaded sleeve being screwed on to the externally threaded portion. In addition, there is provided a movable holding sleeve having grooves and stops. The holding sleeve may be moved into any position relative to a rotary cross member of the adjusting sleeve provided with teeth for the purpose of changing the length of the lifting strut. Furthermore, the holding sleeve, with its grooves, may be moved across the teeth of the rotary cross member and across the teeth provided at the threaded sleeve in a corresponding position in order to arrest the change in length.

18 Claims, 4 Drawing Sheets

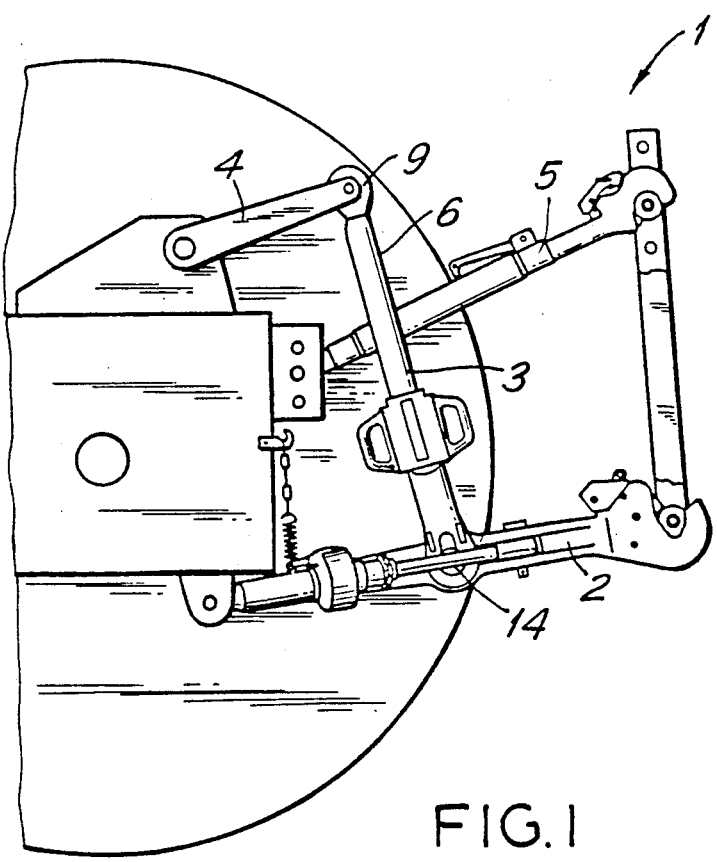
FIG.1
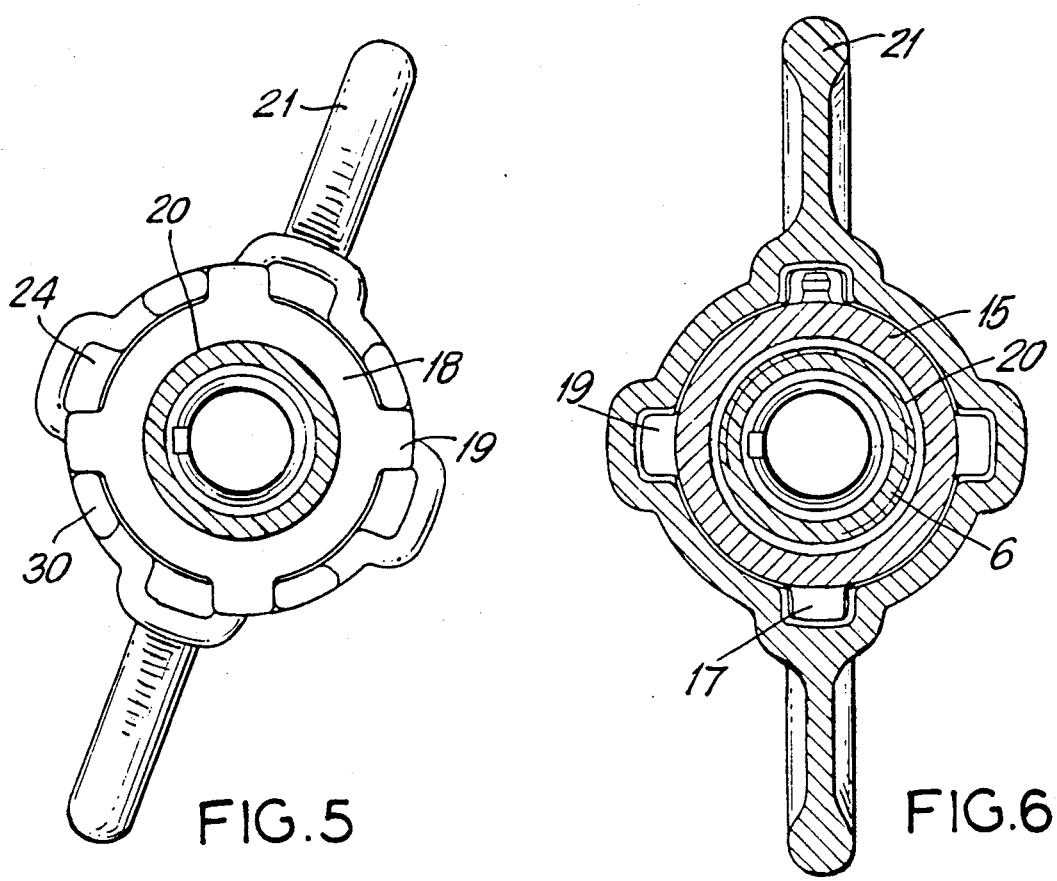
FIG.5
FIG.6

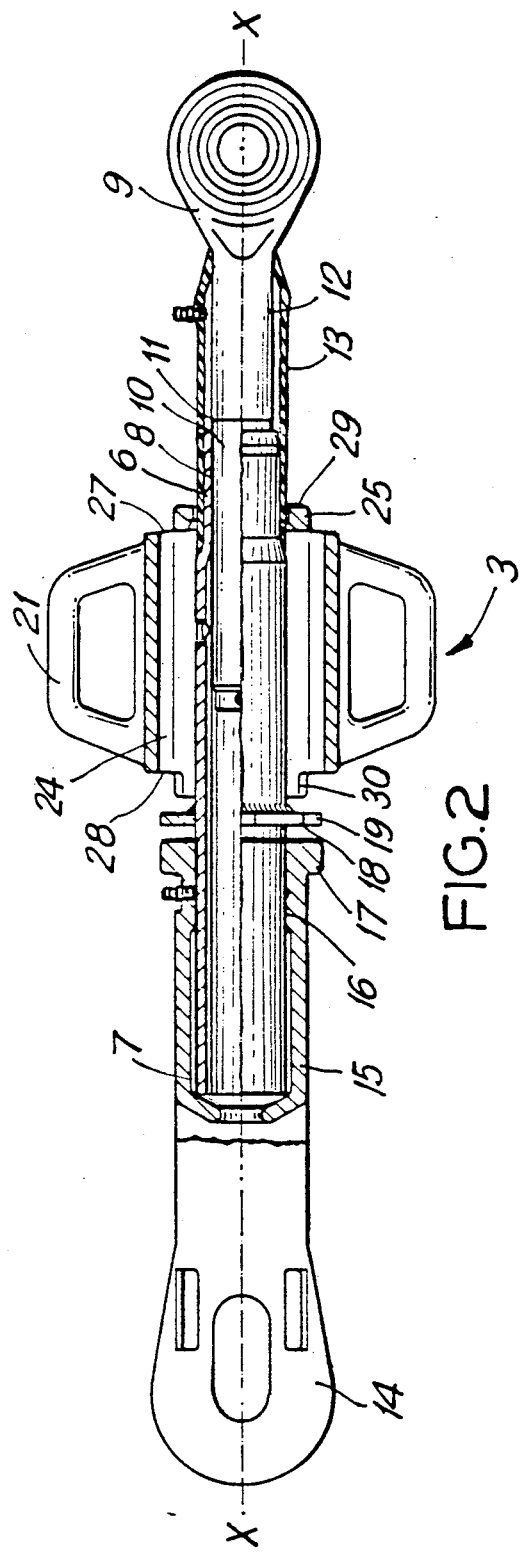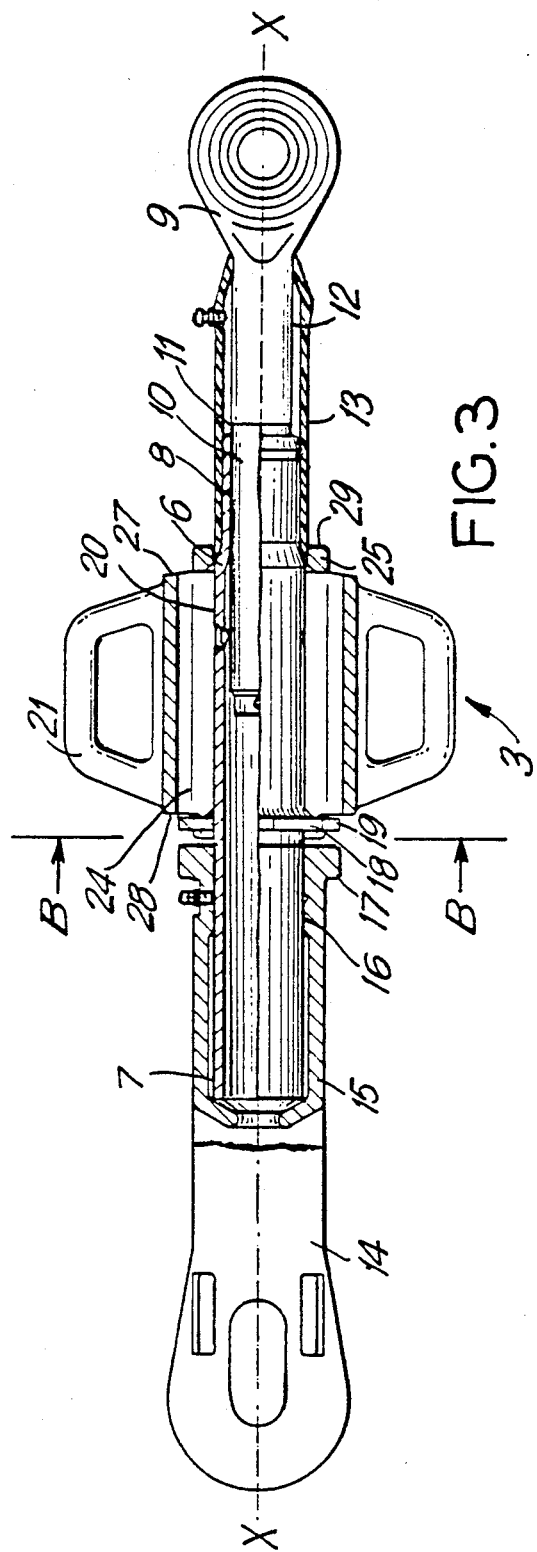

LIFTING STRUT FOR A TRACTOR

BACKGROUND OF THE INVENTION

The invention relates to a length-adjustable lifting strut for the lower steering arm of the attaching device of a tractor. The strut may be raised and lowered via a power drive and has one connecting end secured to the power arm of the power drive and another connecting end secured to the lower steering arm. The connecting ends, via threads extending in opposite directions, are received on threaded portions of an adjusting sleeve rotatable via a holding sleeve.

The holding sleeve is firmly connected to the adjusting sleeve, and the change in length may be effected by operating the holding sleeve.

From U.S. Pat. No. 3,056,458 there is known a three-point attaching device including a lifting strut in the case of which the lifting strut is designed to be telescopic. In addition to being telescopic, the strut is designed to be adjusted via a threaded. The free telescopic nature may be eliminated. For securing purposes, there are provided plug-in connections which fix the two connecting ends in certain arresting positions relative to each other.

SUMMARY OF THE INVENTION

It is an object of the present invention to provide a lifting strut which, with reference to the members adjustable inside each other, is as short as possible, which is easier to operate and in the case of which when the required length is achieved, adjustment is arrested without having to use special fixing means.

Pursuant to this object, and others which will become apparent hereafter, one aspect of the present invention resides in one end of the adjusting sleeve being provided with an externally threaded portion and the other end with an internally threaded portion. One connecting end comprises a threaded sleeve which is provided with an internal thread and is screwed on to the externally threaded portion of the adjusting sleeve, and the other connecting end comprises a threaded journal which is screwed into the internally threaded portion of the adjusting sleeve so as to be movable in the axial direction and may optionally be transferred so as to enter a non-rotating connection with the adjusting sleeve and/or the threaded sleeve.

The advantage of this design is that rotation of the adjusting sleeve and adjustment of the length of the lifting strut may be achieved with the help of the movable holding sleeve. Due to the independent movability of the holding sleeve it is possible to achieve the most favorable holding position for the operator to suit the respective requirements. This may be achieved by engaging the groove in the holding sleeve and the teeth of the adjusting sleeve. Furthermore, adjustment may be arrested by sliding the holding sleeve over the teeth of both the adjusting sleeve and the threaded sleeve so that the rotational position of the threaded sleeve relative to the adjusting sleeve can no longer change. The length of the lifting strut is thus fixed. Furthermore, it is conceivable to move the holding sleeve into a position of engagement only with the threaded sleeve so that, additionally, it is possible to achieve a precision adjustment by merely adjusting the threaded sleeve on the adjusting sleeve.

A further advantage resides in that, in the arrested position, the holding sleeve covers the externally threaded portion of the adjusting sleeve, thereby preventing it from being damaged.

The arresting facility is obtained as a result of the special arrangement of the threaded portions of the adjusting sleeve. At the same time, by combining the externally threaded portion with the internally threaded portion one obtains the advantage of achieving the shortest possible length and the highest possible degree of displacement. The entire length of the adjusting sleeve is available for inserting the threaded journal of the other connecting end. As a rule, the lifting strut is assembled so that the connecting end provided with the threaded sleeve is associated with the lower steering arm, whereas the other connecting end is associated with a power arm of the power drive.

According to a further embodiment of the invention, the adjusting sleeve and the threaded sleeve are each provided with at least one tooth radially projecting from their outer faces. The holding sleeve, in its bore, comprises at least one axially extending groove which is adapted to the teeth and by means of which it may be moved across the teeth of the threaded sleeve and/or of the adjusting sleeve, i.e., the means for providing a non-rotating connection between the threaded sleeve and/or the adjusting sleeve are represented by the teeth and grooves.

To be able to transfer the holding sleeve into the most advantageous position, it is advisable to provide a freely rotating position where it is disengaged from the adjusting sleeve and the threaded sleeve.

For further increasing the number of positions of attack into which the holding sleeve may be transferred relative to the adjusting sleeve, it is proposed that the holding sleeve, at its end face facing the threaded sleeve, is provided with at least one stop which projects and is circumferentially offset relative to the groove and which may be made to rest non-rotatingly against the teeth associated with the adjusting sleeve. For this purpose, the threaded sleeve and the adjusting sleeve are preferably provided with two diametrically opposed teeth, with the holding sleeve being provided with four grooves rectangularly offset relative to each other.

Although the teeth of the adjusting sleeve may be formed on directly, it is advisable to associate them with a disc-like adjusting cross member which is connected to the adjusting sleeve.

To secure the position of the holding sleeve, the holding sleeve, at its end face facing away from the threaded sleeve, is provided with a stop collar. Because of the approximately vertical arrangement of the lifting strut, the stop collar ensures that the holding sleeve is held in the correct position relative to the adjusting sleeve and the threaded sleeve.

To optimize the possibilities of varying the positions of attack of the holding sleeve, it is proposed that a stop should be provided between each two grooves, i.e., there is provided a total of four stops and four grooves so that a considerable increase in the positions of attack is achieved.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWING

FIG. 1 is a diagrammatic view of the rear end of a tractor having a three-point attaching device;

FIG. 2 is a longitudinal section through a lifting strut pursuant to the invention, with the holding sleeve in a freely rotating position;

FIG. 3 is a longitudinal section according to FIG. 2, but with the holding sleeve in an adjusting position;

FIG. 5 is a section along line B—B in FIG. 3;

FIG. 6 is a section along line A—A in FIG. 4;

DETAILED DESCRIPTION OF THE PREFERRED EMBODIMENT

Figure 4:
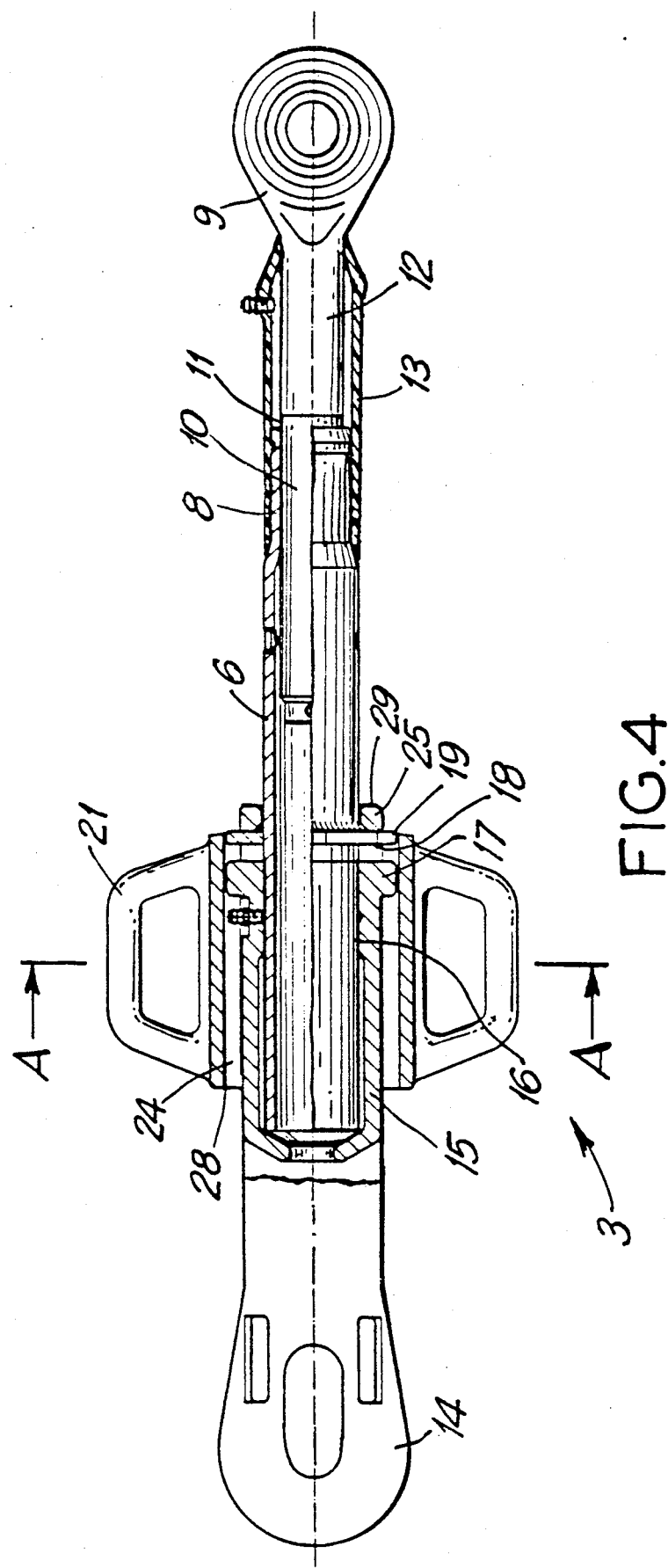
FIG. 4 is a longitudinal section according to FIG. 2, with the holding sleeve in an arrested position.
Figure 8:
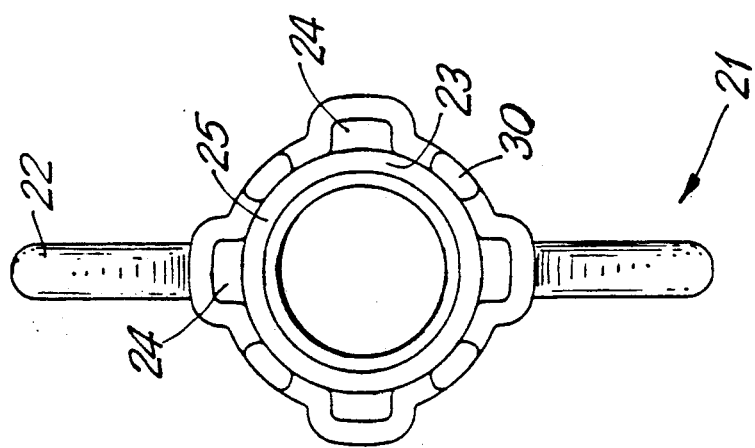
FIG. 8 is a view of the end face of the holding sleeve comprising the stops, according to FIG. 7.
Figure 7:
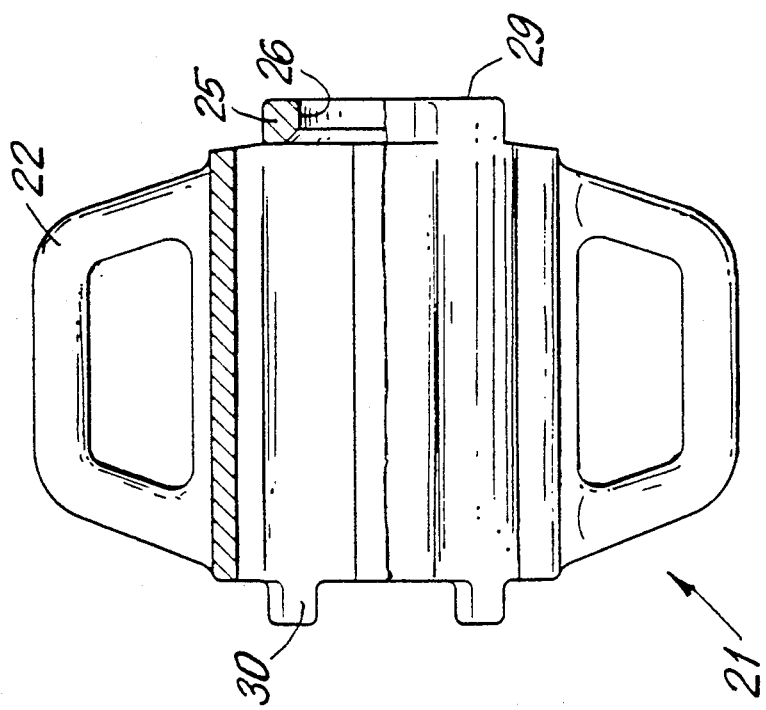
FIG. 7 shows the holding sleeve as a detail, partially in section.
Figure 9:
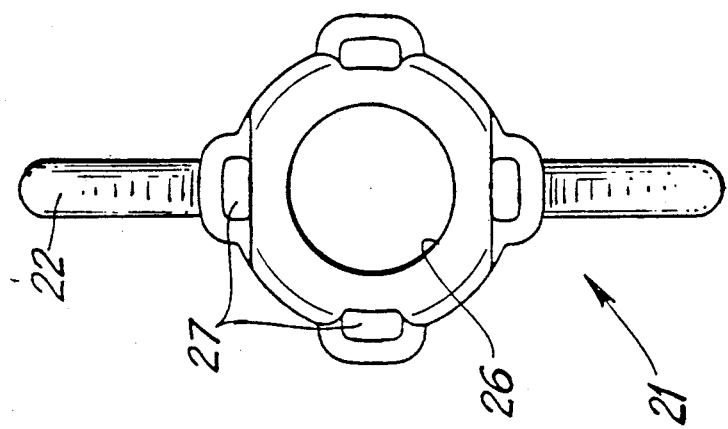
FIG. 9 is a view of the end face of the holding sleeve comprising the stop collar.

The tractor 1 shown in FIG. 1, at its rear end, comprises a three-point attaching device. The three-point attaching device comprises two lower steering arms 2, only one of which is visible because the second one is arranged in the intermediate plane at a distance from the first one. The two lower steering arms 2 are arranged so as to be laterally offset relative to the longitudinal axis of the tractor 1. The lower steering arms 2 may be raised and lowered via a power drive (not illustrated) of the tractor 1. For this purpose there are provided two power arms 4, each of which is connected to a lower steering arm 2 via a lifting strut 3. The upper connecting end 9 is designed as a ball joint, for example, whereas the lower connecting end 14 is associated with the lower steering arm 2 and extends over the lower steering arm in a yoke-like manner. The lifting strut 3 is connected via a pin connection to the lower steering arm 2 and the associated power arm 4 so as to be articulated.

A lifting strut is described in detail in connection with FIGS. 2 to 9. The lifting strut 3 comprises a tubular adjusting sleeve 6 which toward one end is provided with an externally threaded portion 7 and toward the other end with an internally threaded portion 8. The internally threaded portion 8 is associated with the connecting end 9 comprising the ball joint. The ball joint of the connecting end 9 is followed by a threaded journal 10 which is screwed into the internally threaded portion 8 in the bore of the adjusting sleeve 6. The pitches of the two threaded portions 7, 8 of the adjusting sleeve 6 extend in opposite directions. The threaded portion of the threaded journal is given in the reference number 11. This is followed, in the direction of the ball joint, by a cylindrical portion 12. The adjusting sleeve 6 is associated with a sealing cap 13 sealingly resting against the cylindrical portion 12 of the connecting end 8. For supplying the two engaging threads of the threaded journal 10 and of the internally threaded portion 8 provided in the bore with lubricant, a lubricating nipple may be formed into the sealing cap 13.

The second connecting end 14 of the lifting strut 3 is screwed on to the externally threaded portion 7 of the adjusting sleeve 6. It can be seen that the second connecting end 14 comprises a connecting yoke which has to be connected to the lower steering arm 2. Furthermore, the second connecting end 14 comprises a threaded sleeve 15 whose bore is provided with an internal thread 16 by means of which the threaded sleeve 15 is screwed on to the externally threaded portion 7 of the adjusting sleeve 6. From the outer face of the threaded sleeve 15 there radially project two diametrically opposed teeth 17. At a distance from the externally threaded portion 7, a disc-shaped rotary cross member 18 is firmly attached to the outer circumference of the adjusting sleeve 6. The rotary cross member 18 comprises two pairs of teeth 19 corresponding to the teeth 17 of the threaded sleeve 15. In this way, the number of possible arresting positions is increased. Only one pair is necessary. The two teeth 17 and 19 have identical cross-sectional shapes.

The design of the teeth 17, 19 of the threaded sleeve 15 and the rotary cross member 18, respectively, is shown in more detail in the cross-sections as illustrated in FIGS. 5 and 6.

Furthermore, the outer face 20 of the adjusting sleeve 6 is provided with a holding sleeve 21. As is particularly obvious from FIGS. 7 to 9, two diametrically opposed handles 22 radially project from the outer face of the holding sleeve 21. These are to be engaged by hand for rotating the adjusting sleeve 6. The holding sleeve 21 further comprises a bore 23 which, across its circumference, is provided with four axially extending grooves 24. The grooves 24 and the diameter of the bore 23 are designed so that the holding sleeve 21 may be moved across the rotary cross member 18 with its teeth 19 and across the teeth 17 and the outer contour of the threaded sleeve 15. Furthermore, the holding sleeve, on its end face 29 facing away from the threaded sleeve 15, comprises a stop collar 25 projecting radially inwardly into the contour of the bore 23. The stop collar 25 is also provided with a bore which is given the reference number 26. It is adapted to the outer diameter of the adjusting sleeve 6 so as to ensure easy movability of the holding sleeve 21 on the adjusting sleeve 6. In the region of the grooves 24, the end face 29 is provided with apertures 27 which serve to ensure that dirt cannot be deposited in the grooves 24 and that any dirt is moved outwardly through the apertures 27 when the holding sleeve 21 is moved across the teeth 19.

Stops 30 axially project from the end face 28 of the holding sleeve 21 facing the threaded sleeve 15. There are provided a total of four stops 30 which are circumferentially offset relative to the grooves 24. Between each two grooves 24 following each other circumferentially there is provided one stop 30.

In the case of the position as illustrated in FIG. 2, the holding sleeve 21 is in the freely rotating position. In this position the holding sleeve 21 is freely rotatable by hand on the adjusting sleeve 6 for the purpose of ensuring that the holding sleeve 21 is moved into the correct position of attack relative to the rotary cross member 18 in order to achieve the longest possible lever arm for rotating the adjusting sleeve 6 for changing the length of the lifting strut 3 due to the threads of the threaded portions 7 and 8 extending in opposite directions. For this purpose, all the stops 30—as is particularly obvious from FIG. 5—may be made to establish circumferential contact with the four teeth 19 of the rotary cross member 18 connected to the adjusting sleeve 6 (FIGS. 3 and 5). However, it is also possible to use the grooves 24 of the holding sleeve 21 for establishing a non-rotating connection with the teeth 19 of the rotary cross member 18. When the correct length is obtained, adjustment may be arrested in that, after the teeth 19 of the rotary cross member 18 have been aligned relative to the teeth 17 of the threaded sleeve 15, the holding sleeve 21, with the grooves 24, is moved across the teeth 19 of the rotary cross member 18 and across the teeth 17 of the threaded sleeve 15. Downward displacement in the assembled condition of the lifting strut 3 at the tractor 1 continues until the stop collar 25 of the holding sleeve 21 comes to rest against the rotary cross member 18. As the lifting strut 3 is arranged substantially vertically, the holding sleeve 21, because of its own weight, is also held in this position, i.e., its stop collar 25 remains in contact with the rotary cross member 18. The arrested position is indicated in FIG. 4. As the connecting end 14 provided with a connecting yoke and associated with the threaded sleeve 15 is non-rotatingly held at the lower steering arm 2, a change in length is already prevented in that the adjusting sleeve 6 and the threaded sleeve 15 are blocked relative to each other via the holding sleeve 21. Rotation of the further connecting end 9 is not possible.

While the invention has been illustrated and described as embodiment in a lifting strut for a tractor, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

We claim:

1. A length-adjustable lifting strut for a lower steering arm of an attaching device of a tractor, which strut is raisable and lowerable by a power drive and has one connecting end secured to a power arm of the power drive and another connecting end secured to the lower steering arm, which connecting ends, via threads having oppositely extending pitches, are received on threaded portions of an adjusting sleeve rotatable via a holding sleeve, the holding sleeve having a bore defined through its length, the adjusting sleeve (6) having one end provided with an externally threaded portion (7) and another end with an internally threaded portion (8), the one connecting end (14) comprising a threaded sleeve (15) which is provided with an internal thread (16) and is screwed on to the externally threaded portion (7) of the adjusting sleeve (6), the another connecting end (9) comprising a threaded journal (10) which is screwed into the internally threaded portion (8) of the adjusting sleeve (6), and the adjusting sleeve (6) being arranged through the bore of the holding sleeve (21) so that the holding sleeve is slidably movable in an axial direction so as to engage in a non-rotating connection with at least one of the adjusting sleeve (6) and the threaded sleeve (15).

2. A lifting strut according to claim 1, wherein the adjusting sleeve (6) and the threaded sleeve (15) are each provided with at least one tooth (17, 19) radially projecting from their outer faces, the holding sleeve (21), in its bore (23), having at least one axially extending groove (24) adapted to the teeth (17, 19) by means of which groove the holding sleeve (21) is movable across the at least one tooth (17, 19) of at least one of the threaded sleeve (15) and the adjusting sleeve (6).

3. A lifting strut according to claim 1, wherein the holding sleeve (21) is slidably movable into a freely rotating position in which it is disengaged from the adjusting sleeve (6) and the threaded sleeve (15).

4. A lifting strut according to claim 2, wherein the holding sleeve (21) has an end face (28) which faces the threaded sleeve (15), and is provided with at least one stop (30) which projects so as to be circumferentially offset relative to the at least one groove (24) and which is non-rotatingly rest-able against the at least one tooth (19) associated with the adjusting sleeve (6).

5. A lifting strut according to claim 3, wherein the holding sleeve (21) has an end face (28) which faces the threaded sleeve (15), and is provided with at least one stop (30) which projects so as to be circumferentially offset relative to a at least one groove (24) and which is non-rotatingly rest-able against the at least one tooth (19) associated with the adjusting sleeve (6).

6. A lifting strut according to claim 1, wherein the threaded sleeve (15) and the adjusting sleeve (6) are provided with two diametrically opposed teeth (17, 19), the holding sleeve (21) being provided with four grooves (24) rectangularly offset relative to each other.

7. A lifting strut according to claim 2, wherein the threaded sleeve (15) and the adjusting sleeve (6) are provided with two diametrically opposed teeth (17, 19), the holding sleeve (21) being provided with four grooves (24) rectangularly offset relative to each other.

8. A lifting strut according to claim 4, wherein the threaded sleeve (15) and the adjusting sleeve (6) are provided with two diametrically opposed teeth (17, 19), the holding sleeve (21) being provided with four grooves (24) rectangularly offset relative to each other.

9. A lifting strut according to claim 5, wherein the threaded sleeve (15) and the adjusting sleeve (6) are provided with two diametrically opposed teeth (17, 19), the holding sleeve (21) being provided with four grooves (24) rectangularly offset relative to each other.

10. A lifting strut according to claim 2, wherein the at least one tooth (19) of the adjusting sleeve (6) is associated with a disc-like adjusting cross member (18) which is connected to the adjusting sleeve (6).

11. A lifting strut according to claim 2, wherein the holding sleeve (21) has an end face (29) which faces away from the threaded sleeve (15), and is provided with a stop collar (25).

12. A lifting strut according to claim 11, wherein the stop collar (25), in close proximity of the at least one groove (24), is provided with an aperture (27) at its periphery.

13. A lifting strut according to claim 4, wherein a stop (30) is provided between each two grooves (24).

14. A lifting strut according to claim 5, wherein a stop (30) is provided between each two grooves (24).

15. A lifting strut according to claim 6, wherein a stop (30) is provided between each two grooves (24).

16. A lifting strut according to claim 7, wherein a stop (30) is provided between each two grooves (24).

17. A lifting strut according to claim 8, wherein a stop (30) is provided between each two grooves (24).

18. A lifting strut according to claim 9, wherein a stop (30) is provided between each two grooves (24).

* * * * *

UNITED STATES PATENT AND TRADEMARK OFFICE
CERTIFICATE OF CORRECTION

PATENT NO.   : 5,042,588
DATED        : August 27, 1991
INVENTOR(S)  : Paul Herchenbach et al It is certified that error appears in the above-identified patent and that said Letters Patent is hereby corrected as shown below: On the title, assignee should read:

-- [73] Assignee:  Jean Walterscheid GmbH
                   Federal Republic of Germany--.

Signed and Sealed this

Sixteenth Day of March, 1993

Attest:

STEPHEN G. KUNIN

*Attesting Officer*   Acting Commissioner of Patents and Trademarks